United States Patent
Lind

(10) Patent No.: US 10,976,430 B2
(45) Date of Patent: Apr. 13, 2021

(54) RADAR ARRANGEMENT

(71) Applicant: VOLVO CAR CORPORATION, Gothenburg (SE)

(72) Inventor: Henrik Johannesson Lind, Torslanda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 317 days.

(21) Appl. No.: 15/920,996

(22) Filed: Mar. 14, 2018

(65) Prior Publication Data

US 2018/0275269 A1 Sep. 27, 2018

(30) Foreign Application Priority Data

Mar. 21, 2017 (EP) ..................... 17161941

(51) Int. Cl.
*G01S 13/931* (2020.01)
*B65B 1/04* (2006.01)
(Continued)

(52) U.S. Cl.
CPC ........ *G01S 13/931* (2013.01); *B60K 31/0008* (2013.01); *B65B 1/04* (2013.01); *G01S 7/02* (2013.01); *B60R 13/005* (2013.01); *B60R 2011/004* (2013.01); *G01S 2007/027* (2013.01); *G01S 2013/93271* (2020.01);
(Continued)

(58) Field of Classification Search
CPC ......... G01S 13/931; G01S 2013/93277; G01S 2013/93274; G01S 2013/93271; G01S 2013/93272; G01S 2007/027; B65B 1/04; B60R 13/005; B60R 2011/004; B60R 13/07; H01Q 1/3233; H01Q 1/3283;
(Continued)

(56) References Cited

U.S. PATENT DOCUMENTS 6,600,103 B1    7/2003    Schmidt et al.
10,599,518 B2 *   3/2020    Rao .......................... G01S 13/42
(Continued)

FOREIGN PATENT DOCUMENTS

DE       198 20 708 A1     11/1999
DE       19820708 A1 * 11/1999 ............... G01S 7/02
(Continued)

OTHER PUBLICATIONS

Extended European Search Report dated Feb. 6, 2018, Application No. 17161941.4-1206, Applicant Volvo Car Corporation, 15 Pages.

*Primary Examiner* — Erin F Heard
*Assistant Examiner* — Michael W Justice
(74) *Attorney, Agent, or Firm* — Brooks Kushman P.C.

(57) ABSTRACT

The present disclosure relates to a radar arrangement for a vehicle comprising a design element, such as an emblem or a vehicle light, and a radar device comprising a plurality of radar device units, wherein the radar device and the design (Continued)

element are integrated with each other such that they form one common integral unit. The design element comprises a main body having a cavity that houses the radar device. The cavity may be filled with a filling material, and the radar device may be embedded in the filling material. The disclosure also relates to a vehicle comprising the radar arrangement. The disclosure further relates to a method of manufacturing a radar arrangement.

15 Claims, 4 Drawing Sheets

(51) Int. Cl.
  *B60K 31/00*   (2006.01)
  *G01S 7/02*   (2006.01)
  *B60R 13/00*   (2006.01)
  *H01Q 1/32*   (2006.01)
  *B60R 11/00*   (2006.01)

(52) U.S. Cl.
  CPC ............. *G01S 2013/93272* (2020.01); *G01S 2013/93274* (2020.01); *G01S 2013/93277* (2020.01); *H01Q 1/3233* (2013.01); *H01Q 1/3283* (2013.01)

(58) Field of Classification Search
  CPC ... E05F 15/20; E05F 15/2023; E05F 15/2046; E05F 15/2076
  See application file for complete search history.

(56) References Cited

U.S. PATENT DOCUMENTS

| | | | |
|---|---|---|---|
| 10,775,493 B2* | 9/2020 | Santra | G01S 13/904 |
| 2014/0093665 A1 | 4/2014 | Horibe et al. | |
| 2017/0160385 A1* | 6/2017 | Iske | G01S 13/931 |
| 2020/0132802 A1* | 4/2020 | Wohlte | G01S 7/006 |
| 2020/0174884 A1* | 6/2020 | Rao | G01S 13/583 |

FOREIGN PATENT DOCUMENTS

| | | | | |
|---|---|---|---|---|
| DE | 199 04 303 A1 | 8/2000 | | |
| DE | 103 05 980 A1 | 9/2004 | | |
| DE | 10 2011 115 939 A1 | 5/2012 | | |
| DE | 10 2016 010 441 A1 | 2/2017 | | |
| DE | 10 2015 113 945 A1 | 3/2017 | | |
| DE | 102015113945 A1 * | 3/2017 | ............ | G01S 7/032 |
| EP | 1 411 369 A1 | 4/2004 | | |
| EP | 2 871 489 A1 | 5/2015 | | |
| EP | 2 966 725 A1 | 1/2016 | | |

* cited by examiner

RADAR ARRANGEMENT

CROSS-REFERENCE TO RELATED APPLICATIONS

This application claims foreign priority benefits under 35 U.S.C. § 119(a)-(d) to European patent application number EP 17161941.4, filed Mar. 21, 2017, which is incorporated by reference in its entirety.

TECHNICAL FIELD

The present disclosure relates to a radar arrangement for a vehicle. The disclosure also relates to a vehicle comprising the radar arrangement. The disclosure further relates to a method of manufacturing a radar arrangement.

BACKGROUND

New systems in the vehicles for assisting the driver and/or autonomously driving the vehicle often use one or more radar devices for detection of external objects around the vehicle.

Patent document DE 10 2011 115939 A1 discloses a device for arranging an emblem i.e., company logo, at a front end of a motor vehicle, such as passenger car. The device has a sensor held by a holding part behind the emblem as seen in the vehicle longitudinal direction for detecting collision of the vehicle with an obstacle. The sensor may be a radar sensor.

SUMMARY

The object of the present disclosure is to overcome or ameliorate at least one of the disadvantages of the prior art, or to provide a useful alternative.

Thus, the disclosure relates to a radar arrangement for a vehicle comprising a design element, such as an emblem or a vehicle light, and a radar device comprising a plurality of radar device units, wherein the radar device and the design element are integrated with each other, such that they form one common integral unit.

Thereby a very compact radar arrangement is obtained, which occupies less space and is easier to handle than radar arrangements known from prior art, e.g., from the above-mentioned DE 10 2011 115939 A1. The radar arrangement according to the disclosure is further easier to mount to the vehicle, since the radar arrangement can be handled as one unit. There is not a plurality of parts which are separate from each other, as in prior art systems, and which have to be individually attached to the vehicle or pre-mounted to each other before attachment to the vehicle. Instead, the radar device of the radar arrangement according to the disclosure is permanently fixed to the design element and they are provided as one common integral unit. No bracket is needed for attaching the radar device to the design element or to the vehicle, since the radar device is integrated in the radar arrangement.

As mentioned above, the radar device and the design element are integrated with each other, such that they form one common integral unit. The radar device may e.g., be embedded in a cavity of the design element, which is further described below. It is thus possible to make a radar arrangement having a very low total thickness, such as in the range of 4-30 mm, preferably in the range of 5-25 mm or 6-20 mm, which thickness thus is much less than the length and width of the design element. This gives a large freedom when locating the radar arrangement in the vehicle.

It is known from prior art, e.g., the above-mentioned DE 10 2011 115939 A1 to have a separate element, e.g., a cover, forming an outwards-facing surface of the radar arrangement. However, the radar arrangement as disclosed herein differs from these prior art solutions by dispensing with that separate element forming the outwards-facing surface. Instead the outwards-facing surface is formed by the design element itself.

The design element is made in a radar transparent material. The radar device is positioned in the radar arrangement in such a way that the radar radiation goes through the radar transparent design element, which thus forms a radome for the radar radiation. There is hence no separate element, such as the above-mentioned cover, constituting or comprising the radome.

The design element may be constituted by an emblem, which may comprise a symbol of the vehicle manufacturer, such as a logo. The symbol may be applied on a surface of the design element or in a mid-layer surface, where a top layer located above the symbol is transparent plastic or similar. The symbol may be printed on or painted on the surface of the design element or sputtered if comprising metal. A combination of polymeric materials with different refractive indexes may be utilized to provide a metallic look. If the symbol is interfering with the radar radiation pattern of the radar device, it is preferred to use radar transparent ink or paint. Further, sputtered metal may be radar transparent if not too dense. The color or the painting of the design element may be chosen to match that of the vehicle. If the design element is shaped after an existing design element, such as a logo, the size of the radar arrangement may be adapted to the existing design element.

For some applications, it may be beneficial that the radar arrangement has a shape of a rectangular parallelepiped having a thickness, which is much less than its length and width, or another shape having a thickness which is much less than its extensions in the other two dimensions, since this facilitates easy handling and mounting to the vehicle. In general, the three-dimensional shape of the design element may be chosen such that the design element is large enough to integrate the radar device and yet small enough to facilitate easy handling. The design element may e.g., be just large enough to contain the radar device. The outer contour of the design element may be chosen to have a desired shape, e.g., according to the logo of the vehicle manufacturer. Further, the three-dimensional shape of the radar device may be chosen to match that of the design element. Purely as an example, if the design element has a circular cross-sectional shape, the radar device may also have a circular cross-sectional shape but with a smaller radius than the design element.

The radar device comprises a plurality of radar device units, such that it can perform the desired function of object determination by radar. The plurality of radar device units may be arranged on a printed circuit board, at one of the sides of the printed circuit board, or at both sides of the printed circuit board. The printed circuit board may have a size, including the radar device units located on top of it, wherein the length is in the range of 30-150 mm, the width is in the range of 20-100 mm and the thickness is in the range of from 2-5 mm. The size may depend on the number of radar device units located on the printed circuit board. By using a printed circuit board it is possible to achieve a more compact configuration of the radar device than for prior art radar arrangements.

The radar device typically comprises one or more physical interfaces for connection to the vehicle, e.g., one or more connectors for transmitting signals.

The plurality of radar device units may comprise a transmitter and a receiver, e.g., in the form of patch antennas. The transmitter and/or the receiver may also comprise a controller for controlling the transmitter and/or the receiver. There may optionally be a plurality of transmitters and/or receivers, which may be helpful for determination of lateral angular position and height position estimation of an external object. The height position estimation may be used for compensation for varying vehicle pitch or for suppression of overhead objects.

The plurality of radar device units may comprise a processor and/or a memory. The processor and/or memory may be placed on the rear side of the printed circuit board with the transmitter and the receiver on the front side, such that the radiation used by the transmitter and the receiver do not have to pass though the printed circuit board.

The plurality of radar device units may comprise a power section, which may be mounted on the printed circuit board.

The plurality of radar device units may comprise a ground plane.

A radar device, comprising the transmitter, the receiver, a processor, a memory and a communication section including the above-mentioned physical interface, includes the functions desirable in a highly integrated radar system.

The plurality of radar device units may comprise the transmitter, the receiver and an analogue demodulation with digital out, e.g., using a high speed serial link, also known as a satellite radar device.

One or more of the radar device units, e.g., of the radar device units mentioned above, may be combined into a single integrated circuit. Thereby a very compact configuration of the radar device is possible.

The design element may comprise a main body, comprising or being constituted by a radar transparent material, the main body having a cavity housing the radar device. The radar device is small enough to fit in the cavity, preferably without protruding from the design element. The cavity typically has its opening on a side of the design element intended to face the vehicle when being attached to the vehicle, e.g., to face a grill or a door of the vehicle, through which opening the radar device can be inserted during manufacturing of the radar arrangement. Thereby the radar device will be protected from the ambient environment by the design element, an in particular by the material of the bottom of the cavity. The radiation from/to the radar device may pass through the bottom of the cavity, which then functions as a radome for the radar device. Since the radar device is located close to the externally-facing side of the design element, it is possible to obtain a radar arrangement which has a low total thickness and which also has a small total size. The size of the cavity may be chosen to be just large enough to contain the radar device. In particular the cross-sectional shape of the cavity may be adapted to that of the radar device, such that the radar device fits neatly in the cavity. As mentioned above, the radar arrangement may e.g., have the shape of a rectangular parallelepiped with a relatively small thickness or another shape having a thickness which is much less than its extensions in the other two dimensions. The cavity extends in the thickness direction. The cavity may have its opening at one of the surface sides and its bottom at the opposite surface side of the radar arrangement.

The cavity may be at least partly filled by a filling material and the radar device may be at least partly embedded in the filling material, preferably completely embedded in the filling material. There is preferably no air between radar device and design element. The filling material is preferably of a radar transparent material. Further, it is preferred that the filling material is water-resistant. The filling material may comprise cured silicone. The material of the design element, or at least the part of the design element through which the radar radiation passes, is preferably compatible with the filling material in order to provide a good coupling between the materials. They may e.g., have corresponding refractive indexes to provide a good efficiency for the radar waves. A top surface of filling material, e.g., at the surface adapted to face the vehicle, may be flush with a surface of the main body. The filling material helps to protect the radar device from the ambient environment and may act as a sealant around the radar device. Further, since the radar device is embedded in the filling material, it is possible to avoid that the radar radiation has to pass any air, since the filling material is located directly at the surface of the bottom of the cavity without any air gap in between.

As an alternative or a complement to the filling material, the cavity may be covered by a cover. The cover may be integrated in the design element, in such a way that the cover material may be flush with a surface of the main body, such that the radar arrangement has a flat surface at the side facing the vehicle.

The bottom of the cavity, which will function as a radome for the radar device, may be chosen to have a thickness being an integer multiple of lambda/4, wherein lambda is the wavelength of the radar radiation in the material of the radome. The thickness of the bottom of the cavity may be in the range of 1-15 mm, preferably in the range of 2-10 mm or 2-5 mm.

The radar arrangement may further comprise at least one positioning unit, adapted to hold the radar device in a desired position relative to the design element in the cavity. The positioning unit/s may e.g., be utilized to keep a desired distance between the receiver and the transmitter and the bottom of the cavity. There may be a plurality of positioning units forming small supports on which the radar device may abut with the supports being located on/at the bottom of the cavity. As an alternative or a complement, a wall of the cavity may be provided with one or more protrusions for holding the radar device at the desired distance. The protrusion/s may, at least partly, follow an inner circumference of the cavity.

The radar device may comprise a heatable surface, which may be utilized for removal of water and ice on the design element, which otherwise could reduce the radar performance. The heatable surface may be used to dissipate heat from the radar device units. The heatable surface may be a surface located on a portion of the printed circuit board. As an alternative or a complement, the heatable surface may comprise heat wiring integrated on the printed circuit board, e.g., in the form of a heating strip and/or be provided as additional wiring forming a part of the design element.

The radar arrangement may comprise one or more cooling flanges to dissipate heat from the radar device units. As an alternative or a complement, the metal of the adjacent vehicle body, e.g., of the door if the radar arrangement is located in the door, may be utilized for dissipating heat from the radar device units.

The radar arrangement may further be provided with fixations for fixing the radar arrangement to the rest of the vehicle, e.g., to a grill of the vehicle. The fixations may be made of plastics. As an alternative or a complement, the radar arrangement may be attached to the vehicle by means of a fixation constituted by a tape or an adhesive or by other fixation means known in the art.

The radar arrangement may be combined with a camera, which e.g., may be used for assisting parking of the vehicle. The radar arrangement may also comprise a cleaning device, e.g., adapted to keep the outwards-facing side of the design element clean.

The disclosure further relates to a vehicle comprising a radar arrangement as described herein. The radar arrangement may be located at the grill of the vehicle, at sides of the vehicle or at its rear end, e.g., at doors of the vehicle. The radar arrangements may comprise design elements comprising or being constituted by emblems or vehicle lights.

The disclosure also relates to a method of manufacturing a radar arrangement as described herein. The radar arrangement comprises a design element, such as an emblem or a vehicle light, and a radar device, the design element having a main body, comprising or being constituted by a radar transparent material, the main body having a cavity adapted to house the radar device. The method comprises:
providing the design element,
placing the radar device in the cavity.
The method may further comprise:
filling the cavity with a filling material, the step of filling preferably being performed partly before and partly after performing the step of placing the radar device in the cavity.

Preferably the filling is performed such that there at least is filling material between the radar device and the bottom of the cavity. However, preferably there is also filling material on the other side of the radar device, such that the radar device is embedded in the filling material. When mounted in the vehicle, the radar arrangement may be oriented in any desirable direction, but yet there is preferably filling material at both the side of the radar device facing outwards and on the side of the radar device facing inwards into the vehicle.

The step of filling may comprise filling the cavity with enough filling material to completely fill the cavity with the radar device and the filling material, such that a top surface of filling material is formed, which preferably is flush with a surface of the main body.

As an alternative or a complement to filling the filling material into the cavity, the cavity may be covered by a cover, which is described above.

The method may further comprise:
providing at least one positioning unit for holding the radar device in a desired position relative to the design element in the cavity.

Hence, during manufacturing of the radar arrangement, the positioning unit/s is/are provided in the cavity. The cavity is then partly filled with the filling material. The radar device, e.g., the printed circuit board with its radar device units, is placed on top of the already filled filling material. Thereafter more filling material is applied to cover the radar device, preferably enough filling material to completely fill the cavity, such that the cavity comprises the radar device, the positioning unit/s and the filling material.

The method may further comprise:
providing a heatable surface in the radar device.
Example of a heatable surface is given above.

BRIEF DESCRIPTION OF THE DRAWINGS

The present disclosure will hereinafter be further explained by means of non-limiting examples with reference to the attached drawings.

It should be noted that the appended drawings are schematic and that individual components are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure, as defined by the appended claims. A feature from one embodiment may be combined with one or more features of any other embodiment.

Figure 1:
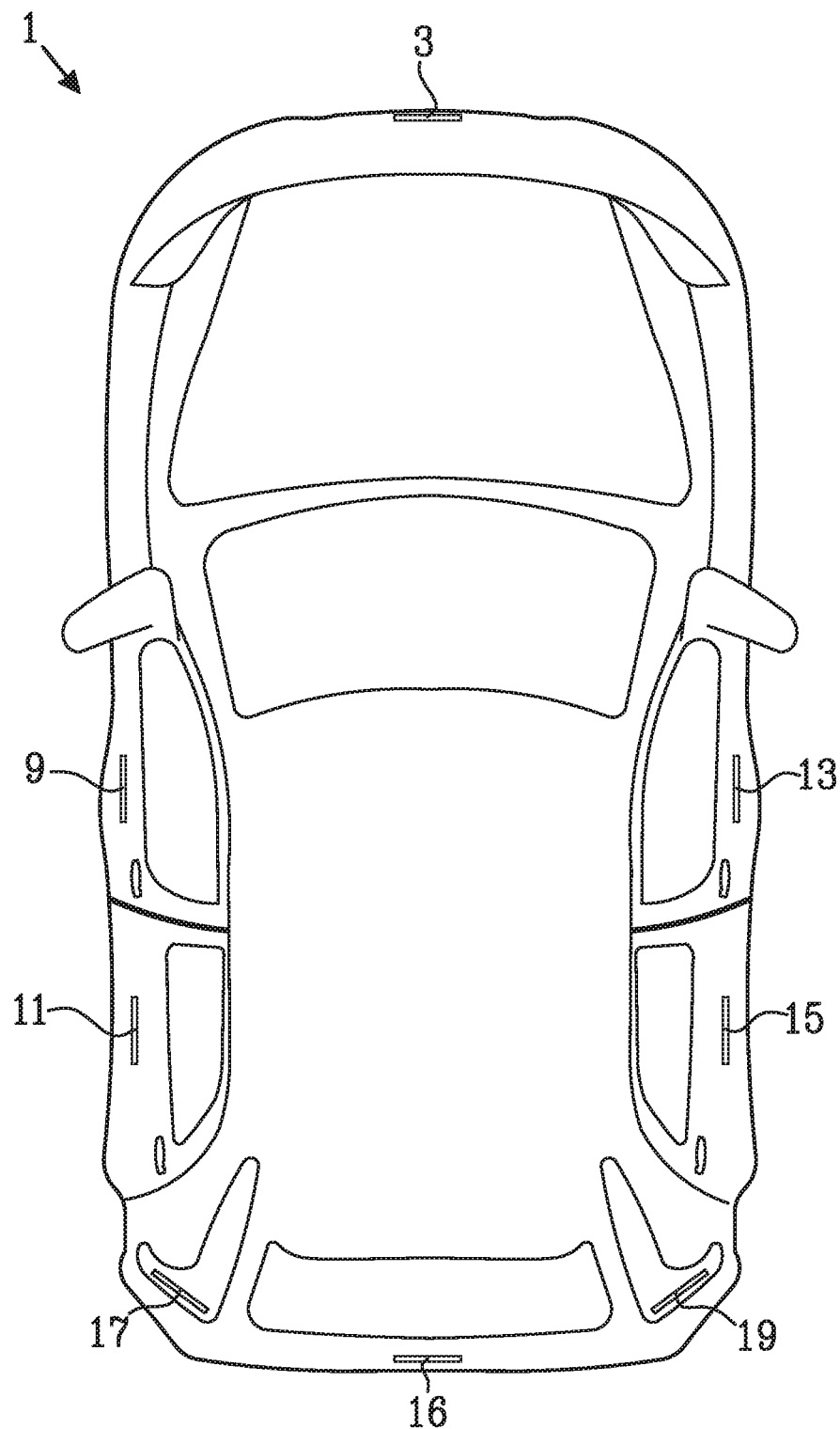
FIG. 1 schematically illustrates a vehicle according to the disclosure.

FIG. 1 schematically illustrates a vehicle 1 comprising one or more radar arrangements 3, 9, 11, 13, 15, 16 according to the disclosure. The radar arrangement 3, which comprises a design element 5 and a radar device 7, will be described in more detail below in conjunction with FIGS. 2-5.

Figure 2:
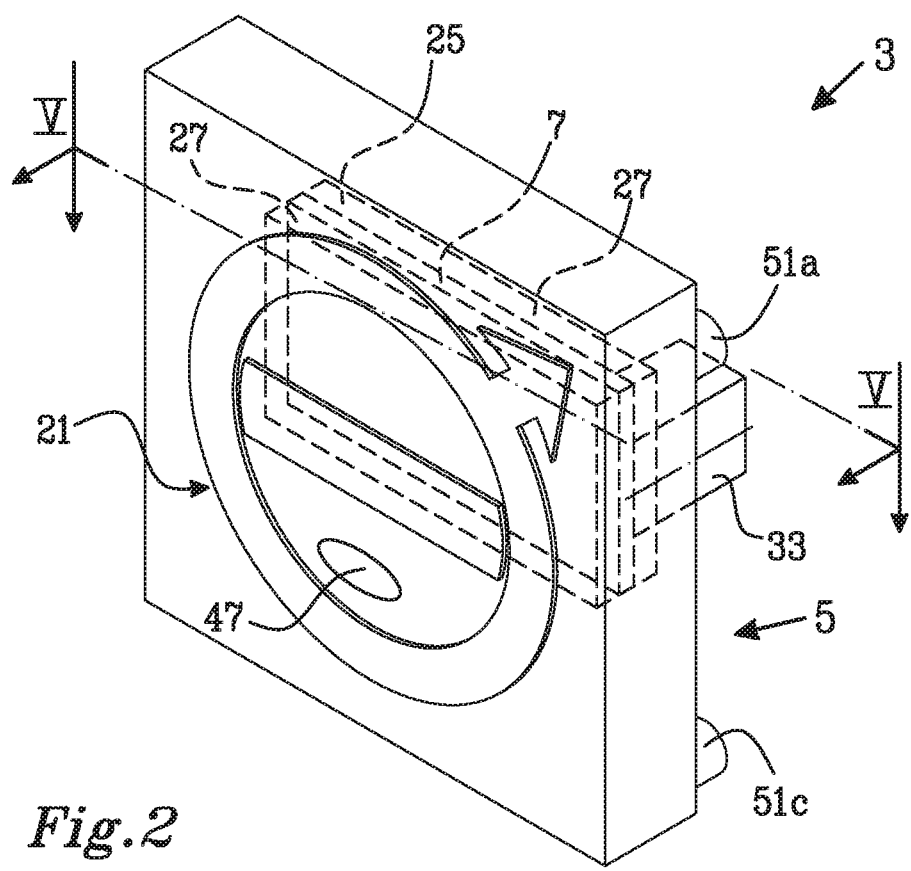
FIG. 2 illustrates a radar arrangement according to an exemplifying embodiment of the disclosure.

FIG. 1 shows a couple of suitable locations for the radar arrangement according to the disclosure. The radar arrangement may e.g., be located at a front of the vehicle 1 forming a front radar arrangement 3. The design element 5 may comprise or be constituted by an emblem with a symbol 21 of the vehicle manufacturer or text, as is illustrated in FIG. 2.

Moreover, going back to FIG. 1, radar arrangements 9, 11, 13, 15, 16 according to the disclosure may be located at sides of the vehicle 1 or at its rear end, e.g., at doors of the vehicle 1. These radar arrangements 9, 11, 13, 15, 16 may comprise design elements comprising or being constituted by emblems, as for the radar arrangement 3 illustrated in FIGS. 2-5.

Furthermore, radar arrangements 17, 19 according to the disclosure may also be integrated into lights of the vehicle 1, such that the light constitutes the design element, in FIG. 1 illustrated as integrated into the rear lights.

Figure 3:
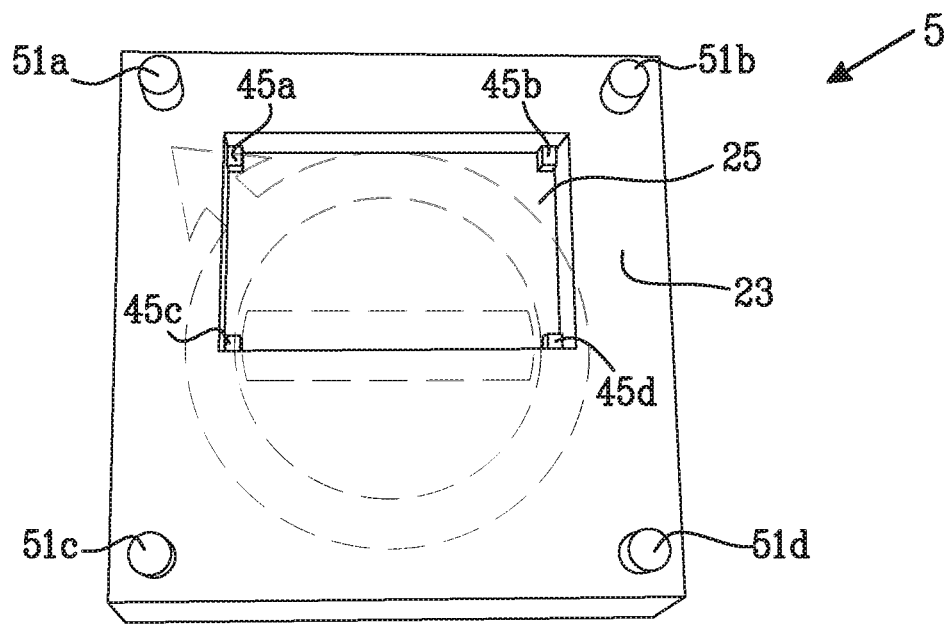
FIG. 3 illustrates a design element of the radar arrangement of FIG. 2.
Figure 4:
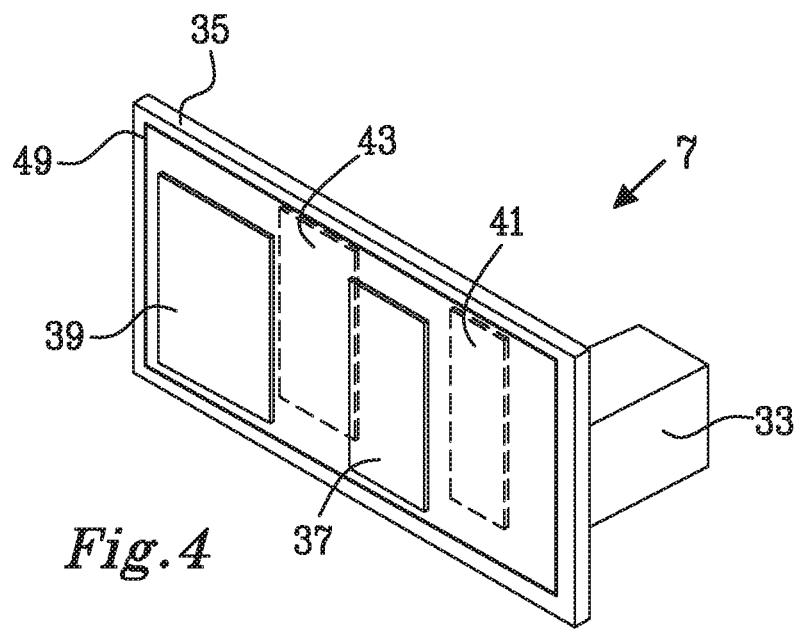
FIG. 4 illustrates a radar device of the radar arrangement of FIG. 2.
Figure 5:
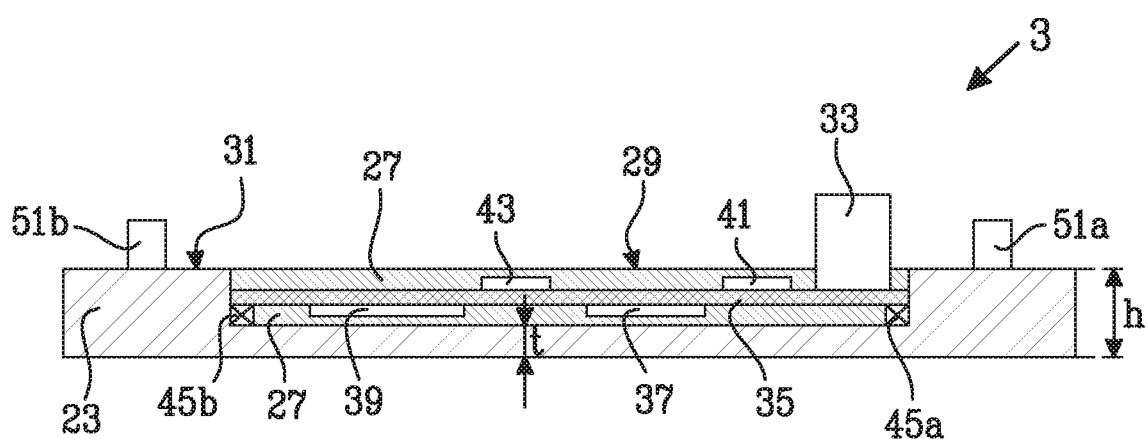
FIG. 5 illustrates a cross-section of the radar arrangement of FIG. 2.

FIGS. 2-5 illustrate a radar arrangement 3 according to the disclosure. As mentioned above, the radar arrangement 3 comprises a design element 5, see FIG. 3, and a radar device 7, see FIG. 4, which are integrated with each other to form one common integral unit, see FIGS. 2 and 5, wherein FIG. 5 is a cross-section of FIG. 2.

The design element 5 is constituted by an emblem, in the illustrated embodiment having a symbol 21 of the vehicle manufacturer. The symbol 21 may be printed on or painted on the surface of the design element 5, and in that case, it is preferred to use radar transparent ink or paint.

The design element 5, see FIGS. 3 and 5, comprises a main body 23 having a cavity 25 housing the radar device 7. The radar device 7 is embedded in a filling material 27, which fills the cavity 25 of the main body 23, such that a top surface 29 of the filling material 27 preferably is flush with a surface 31 of the main body 23. The radar device 7 is smaller than the cavity 25, such that the radar device 7 is completely housed in the cavity 25 and does not protrude. The design element 5 and the radar device 7 form one integral unit. There is hence not a plurality of parts which are separable from each other. Instead, the radar device 7 is permanently fixed to the design element 5 by means of being embedded in the filling material 27. The exemplary radar arrangement 3 has a shape of a rectangular parallelepiped having a thickness h which is much less than its length and width, such as in the range of 4-30 mm, preferably in the range of 5-25 mm or 6-20 mm. The radar device 7 is connectable to a communication system of the vehicle 1 via a physical interface, e.g., an electrical connector 33.

The radar device 7 comprises a plurality of radar device units arranged on a printed circuit board 35, see FIG. 4. The plurality of radar device units comprises antennas in the form of a transmitter 37 and a receiver 39 for radar signals. There is also a processor 41 and a memory 43, which may be located on the opposite side of the printed circuit board 35 as compared to the antennas 37, 39. There may also be, although not illustrated, one or more additional antennas, memories and/or processors. The printed circuit board 35 of the radar device 7 is held in a desired position relative to the design element 5 by means of positioning units 45a, 45b, 45c, 45d located in the cavity 25 of the main body 23 of the design element 5.

The design element 5 is made in a radar transparent material with a radar transparent thickness t, being the thickness of the bottom of the cavity 25, which may be in the range of 1-15 mm, preferably in the range of 2-10 mm or 2-5 mm, see FIG. 5. The radar arrangement 3 may be combined with a camera 47, which may be used for facilitating parking of the vehicle 1, see FIG. 2.

As an option, illustrated in FIGS. 2-5, the printed circuit board 35 may comprise a heatable surface. The heatable surface may be used to dissipate heat from the radar device units 37, 39, 41, 43. As an alternative or a complement, additional heat wiring may be integrated on the printed circuit board 35, here in the form of a heating strip 49, or as a part of the design element 5. The heatable surface may be used for removal of water and ice on the design element, which otherwise could reduce the radar performance.

The radar arrangement 3 is further provided with fixations 51a, 51b, 51c, 51d for fixing the radar arrangement 3 to the rest of the vehicle 1, e.g., to a grill of the vehicle 1. The fixations 51a, 51b, 51c, 51d may be made of plastics. As an alternative or a complement, the radar arrangement 3 may be attached to the vehicle 1 by means of a fixation constituted by a tape or an adhesive any other fixation means known in the art.

Figure 6:
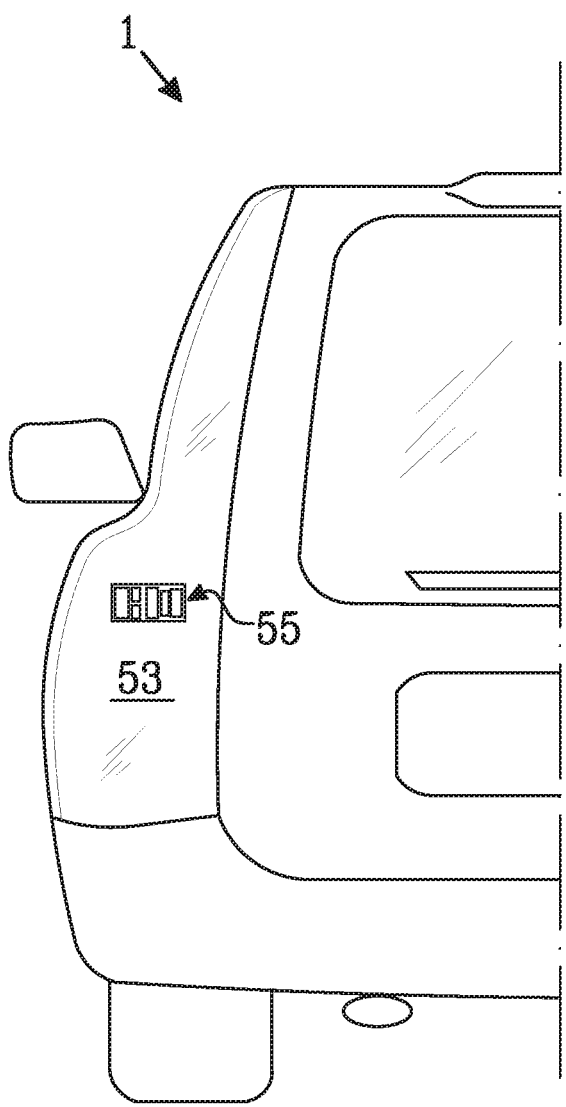
FIG. 6 illustrates a radar arrangement according to a second embodiment of the disclosure.

FIG. 6 illustrates an alternative location in the vehicle 1, namely in a rear brake light 53. In this embodiment, the brake light 53 forms the design element, which has a radar device 55, e.g., similar to the one of FIGS. 2-5, embedded in the rear brake light 53.

Figure 7:
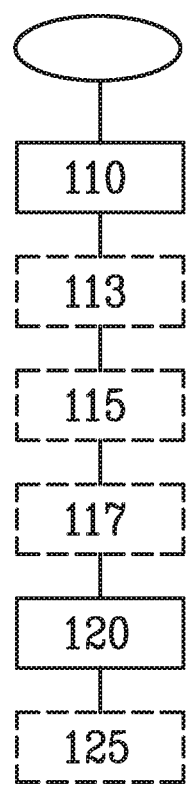
FIG. 7 illustrates a method of manufacturing a radar arrangement according to the disclosure.

Below a method of manufacturing a radar arrangement 3 as disclosed herein is described. See the flowchart of FIG. 7, in which optional steps are illustrated as dashed boxes. The method comprises:

110: Providing the design element 5.
120: Placing the radar device 7 in the cavity 25.

In order to obtain a radar arrangement like the one illustrated in FIGS. 2-5, the method further comprises:

115/125: Filling the cavity 25 with a filling material 27.

This is preferably performed partly before step 120 of placing the radar device in the cavity, see step 115 and partly after step 120, see step 125.

Preferably, the cavity 25 is filled with enough filling material 27 to completely fill the cavity 25 with the radar device 7 and the filling material 27, such that a top surface 29 of filling material 27 is formed which preferably is flush with a surface 31 of the main body 23, see FIG. 5.

In order to hold the radar device 7 in a desired position relative to the design element 5 in the cavity 27, the method comprises:

113: Providing at least one positioning unit 45a, 45b, 45c, 45d for holding the radar device 7 in a desired position relative to the design element 5 in the cavity 25.

Hence, during manufacturing of the radar arrangement 3, the positioning units 45a, 45b, 45c, 45d are provided in the cavity 25. The cavity is then partly filled with the filling material 27. The radar device 7, illustrated as the printed circuit board 35 with its radar device units 37, 39, 41, 43, is placed on top of the already filled filling material 27. Thereafter more filling material 27 is applied to cover the radar device 7, preferably enough filling material 27 to completely fill the cavity 25.

The method may further comprise:

117: Providing a heatable surface in the radar device.

The heatable surface may be provided on the radar device 7, e.g., on the printed circuit board 35, before the radar device is placed in the cavity 25.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. A radar arrangement for a vehicle comprising:
a design element; and
a radar device comprising a plurality of radar device units;
wherein the design element comprises a main body that comprises or is constituted by a radar transparent material, the main body has a cavity housing the radar device, a bottom of the cavity is configured to function as a radome for the radar device, the cavity is filled with a filling material after formation of the main body, the radar device is completely embedded in the filling material, and the radar device and the design element are integrated with each other such that they form one common integral unit, and wherein the plurality of radar device units is arranged on a circuit board, and the plurality of radar device units comprises a transmitter, a receiver and a processor that are all completely embedded in the filling material.

2. The radar arrangement according to claim 1 wherein the design element comprises an emblem or a vehicle light.

3. The radar arrangement according to claim 1 wherein the circuit board comprises a printed circuit board.

4. The radar arrangement according to claim 1 wherein the plurality of radar device units comprises a memory.

5. The radar arrangement according to claim 1 wherein the plurality of radar device units comprises an analogue demodulator with digital out.

6. The radar arrangement according to claim 1 wherein the radar arrangement further comprises at least one positioning unit adapted to hold the radar device in a desired position relative to the design element in the cavity.

7. The radar arrangement according to claim 1 wherein the radar device comprises a heatable surface.

8. A vehicle comprising a vehicle body and the radar arrangement according to claim 1 attached to the vehicle body.

9. A method of manufacturing a radar arrangement including a design element and a radar device, the method comprising:
   providing the design element having a main body comprising a radar transparent material, the main body having a cavity formed therein to house the radar device;
   placing the radar device in the cavity such that a bottom of the cavity is configured to function as a radome for the radar device; and
   filling the cavity with a filling material after formation of the main body so that the radar device is completely embedded in the filling material.

10. The method according to claim 9 wherein the design element comprises an emblem or a vehicle light.

11. The method according to claim 9 wherein the filling is performed partly before and partly after placing the radar device in the cavity.

12. The method according to claim 9 wherein the filling comprises filling the cavity with enough filling material to completely fill the cavity with the radar device and the filling material.

13. The method according to claim 9 further comprising providing at least one positioning unit for holding the radar device in a desired position relative to the design element in the cavity.

14. The method according to claim 9 further comprising providing a heatable surface in the radar device.

15. The method according to claim 9, wherein the radar device comprises a transmitter, a receiver and a processor arranged on a circuit board, and wherein the filling step is performed so that the transmitter, the receiver and the processor are completely embedded in the filling material.

\* \* \* \* \*